United States Patent
Liang (10) Patent No.: US 8,186,523 B2
(45) Date of Patent: May 29, 2012

(54) STACKABLE RACK

(76) Inventor: Jingsong Liang, Jiangmen (CN)

( * ) Notice: Subject to any disclaimer, the term of this patent is extended or adjusted under 35 U.S.C. 154(b) by 333 days.

(21) Appl. No.: 12/600,834

(22) PCT Filed: May 13, 2008

(86) PCT No.: PCT/CN2008/000930
§ 371 (c)(1),
(2), (4) Date: Jan. 5, 2010

(87) PCT Pub. No.: WO2008/141521
PCT Pub. Date: Nov. 27, 2008

(65) Prior Publication Data
US 2010/0140200 A1    Jun. 10, 2010

(30) Foreign Application Priority Data
May 18, 2007 (CN) .................. 2007 2 0051707 U (51) Int. Cl.
*A47B 57/00* (2006.01)
(52) U.S. Cl. ........................................... 211/188
(58) Field of Classification Search .............. 211/188, 211/181.1, 194, 126.9, 126.8; 206/511, 509, 206/513
See application file for complete search history.

(56) References Cited

U.S. PATENT DOCUMENTS

| | | | |
|---|---|---|---|
| 2,600,191 A * | 6/1952 | Beach | 211/194 |
| 2,814,390 A * | 11/1957 | Barbier | 211/126.9 |
| 2,916,293 A * | 12/1959 | Lang | 280/79.3 |
| 3,042,220 A * | 7/1962 | Jakobsson | 108/110 |
| 3,314,549 A * | 4/1967 | Goldreich et al. | 211/132.1 |
| 3,606,025 A * | 9/1971 | Wilson | 211/126.9 |
| 4,079,836 A * | 3/1978 | Von Stein et al. | 206/513 |
| 4,444,320 A * | 4/1984 | Chap | 211/134 |
| 4,732,284 A | 3/1988 | Remmers | |
| 4,805,785 A * | 2/1989 | Pfeifer et al. | 211/188 |
| 4,821,885 A * | 4/1989 | Ondrasik | 206/513 |

(Continued)

FOREIGN PATENT DOCUMENTS
CN    2387792 Y    7/2000
(Continued)

OTHER PUBLICATIONS

International Search Report dated Aug. 28, 2008, for International Application No. PCT/CN2008/000930.

*Primary Examiner* — Sarah Purol
(74) *Attorney, Agent, or Firm* — Knobbe, Martens, Olson & Bear, LLP (57) ABSTRACT

A stackable rack includes two side supports and a shelf plate between the two side supports. The side supports comprises of at least one support unit. The support unit comprises a rectangular frame and a foot support. The rectangular frame is provided with a cross bar to support the shelf plate. The foot support is bent into trapezoid with an oblate metal ring. The two ends of the trapezoid are close and bent into horizontal foot loops. The inner distance of the horizontal foot loops is a little longer than the width of the rectangular frame. The upper side of the foot support clamps the lower side of the rectangular frame and is fixed by welding. The horizontal foot loops of the support of one support unit can fit over the upper corners of the rectangular frame of another support unit, so as to stack up.

5 Claims, 7 Drawing Sheets

U.S. PATENT DOCUMENTS

| | | | |
|---|---|---|---|
| 5,097,971 A * | 3/1992 | Norris et al. | 211/126.6 |
| 5,152,407 A * | 10/1992 | Massoudnia et al. | 211/126.8 |
| 6,318,570 B1 | 11/2001 | Mueller et al. | |
| 6,601,716 B1 | 8/2003 | Hayman et al. | |
| D579,237 S * | 10/2008 | Gusdorf | D6/462 |
| 7,828,160 B2 * | 11/2010 | Lin | 211/181.1 |
| 7,967,155 B2 * | 6/2011 | Klingspor et al. | 211/153 |

FOREIGN PATENT DOCUMENTS

| | | |
|---|---|---|
| CN | 2441370 | 8/2001 |
| CN | 2836598 Y | 11/2006 |
| CN | 201026003 | 2/2008 |
| EP | 1201160 | 5/2002 |
| WO | WO 00/35316 | 6/2000 |
| WO | WO 03/015578 | 2/2003 |

\* cited by examiner

STACKABLE RACK

This application is U.S. National Phase of International Application PCT/CN2008/000930, filed May 13, 2008 designating the U.S., and published in Chinese as WO 2008/141521 on Nov. 27, 2008, which claims priority to Chinese Patent Application No. CN 200720051707.0, filed May 18, 2007.

BACKGROUND OF THE INVENTION

The present invention relates to a stackable rack, and in particular to a stackable rack for placing articles and manufactured from wire.

In the current wire processing industry, the stackable rack normally comprises two side two side supports and a shelf plate between the two side supports; four legs are extended from upper and lower corners, and sleeve joint is used for stacking the racks. If the joining between the sleeve and the leg is too tight, it is hard to align the corresponding upper and lower legs when stacking, and if the joining between the sleeve and the leg becomes loose, it is easy to result in misalignment such that the upper and lower side supports on the same side are not within the same plane, and thus the pressure points are not on the same line, which causes deformation of the stacked racks. Furthermore, the extended four legs may become easy to deformation and misalignment and inconvenience for assembly.

SUMMARY OF THE INVENTION

It is thus an objective of the present invention to provide a stackable rack which is easy to be stacked up and ensures upper and lower side supports on the same side to be within the same plane to reduce deformation and reinforce the stacking.

The above object of the present invention is achieved by the following technical solutions: a stackable rack comprises: two side supports; and a shelf plate between the two side supports; wherein each of the side supports comprises at least one support unit, the support unit comprises a rectangular frame and a foot support means, the rectangular frame is further provided with a cross bar to support the shelf plate, the foot support means is bent into trapezoid with an oblate metal ring, the two ends of the trapezoid are close and bent into horizontal foot loops, the inner distance of the horizontal foot loops is a little longer than the width of the rectangular frame, the upper side of the foot support means clamps the lower side of the rectangular frame and is fixed by welding to form the support unit, the horizontal foot loops of the support means of one support unit are fitted over the upper corners of the rectangular frame of another support unit so as to stack up.

In order to prevent the upper and lower side supports from disengagement, a C-shaped spring buckle for fastening upper and lower adjacent rectangular frames may be further provided at a triangular zone formed between the rectangular frame and a trapezoid edge of the foot support means on each side corner of each stacked boundary.

As the first form of the C-shaped spring buckle, the C-shaped spring buckle is a C-shaped spring buckle with one end edge turned up. When in use, an end of the C-shaped spring buckle which is not turned up grasps one side of the rectangular frame, and then the other end which is turned up snaps on one side of another rectangular frame to connect the upper and lower adjacent rectangular frames.

As the second form of the C-shaped spring buckle, the C-shaped spring buckle is a C-shaped spring buckle with both end edges turned up. When in use, both ends of the C-shaped spring buckle are simultaneously pressed to enclose two connecting sides of another rectangular frame to connect the upper and lower adjacent rectangular frames.

As the third form of the C-shaped spring buckle, the C-shaped spring buckle is a C-shaped spring buckle with one end edge turned up, and the other end rotatably enclosing the lower side of the rectangular frame. When in use, it is only necessary to rotate the spring buckle to allow the turned up end to snap on one side of another rectangular frame so as to connect the upper and lower adjacent rectangular frames.

The present invention is of the following advantages: for the sleeve joint on the corners being used for the connection of stacking, the upper and lower adjacent side supports on the same side are maintained on the same plane. This is because when stacking, the horizontal foot loops of the support means of one support unit are fitted over the upper corners of the rectangular frame of another support unit to form a stacking by planar joint, which enables more stability of the upper and lower side supports. In order to prevent the upper and lower side supports from disengagement, a C-shaped spring buckle for fastening upper and lower adjacent rectangular frames may be further provided at a triangular zone formed between the rectangular frame and a trapezoid edge of the foot support means on each side corner of each stacked boundary. Thus, the stackable rack according to the present invention is easy to be stacked, and the upper and lower side supports on the same side is maintained within the same plane to reduce deformation and reinforce the stacking.

DETAILED DESCRIPTION OF PREFERRED EMBODIMENTS

Many aspects of the invention can be better understood in the following embodiments with reference to the accompanying drawings.

Referring to FIGS. 1 to 13, a stackable rack comprises: two side supports 1; and a shelf plate 2 between the two side supports 1; wherein each of the side supports 1 comprises at least one support unit 3, the support unit 3 comprises a rectangular frame 31 and a foot support means 32, the rectangular frame 31 is further provided with a cross bar 33 to support the shelf plate 2, the foot support means 32 is bent into trapezoid with an oblate metal ring, the two ends of the trapezoid are close and bent into horizontal foot loops 34, the inner distance of the horizontal foot loops 34 is a little longer than the width of the rectangular frame 31, the upper side of the foot support means 32 clamps the lower side of the rectangular frame 31 and is fixed by welding to form the support unit, the horizontal foot loops 34 of the support means 32 of one support unit are fitted over the upper corners of the rectangular frame 31 of another support unit so as to stack up.

Figure 1:
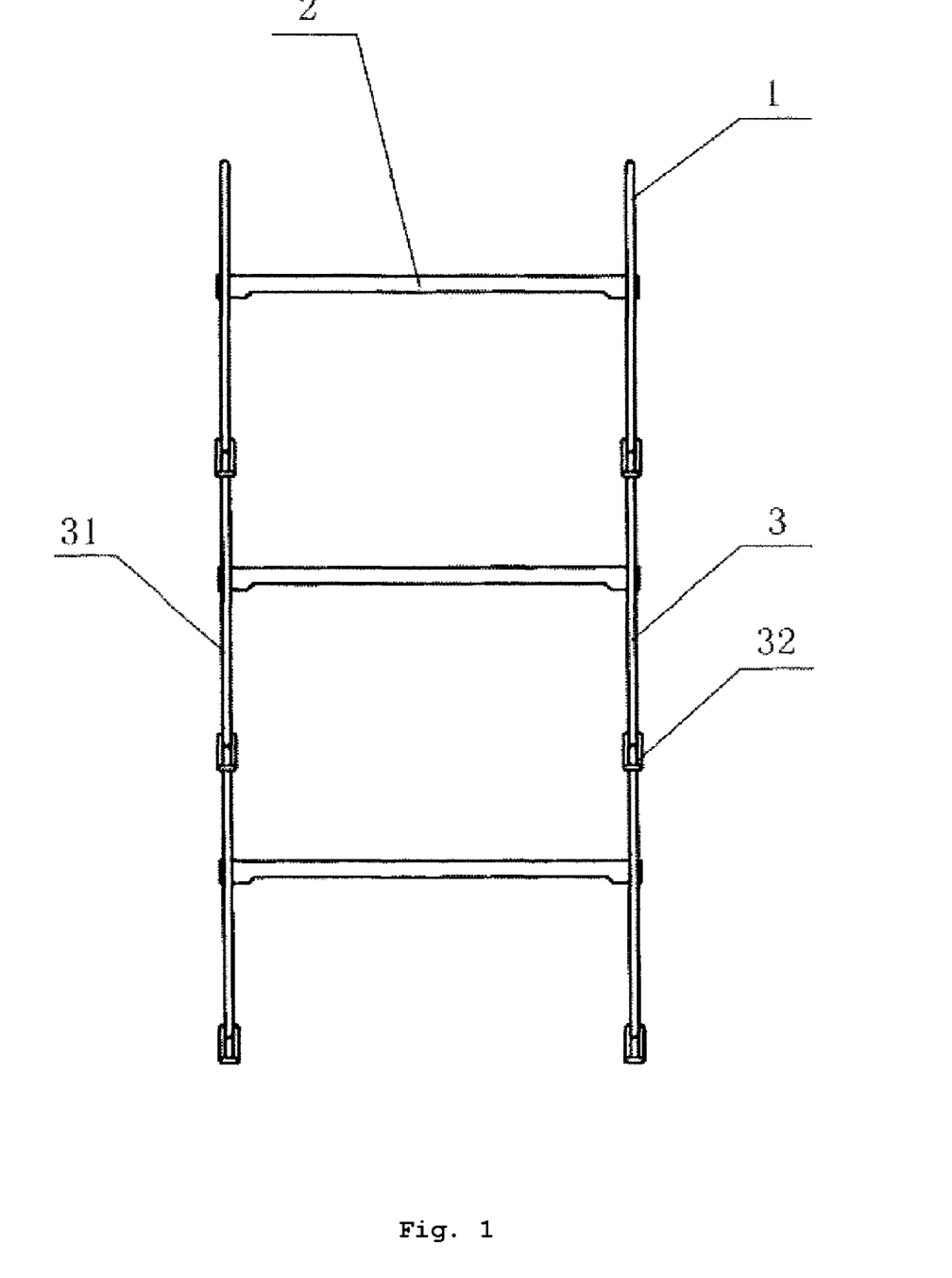
FIG. 1 is a front view of a stackable rack according to an embodiment of the present invention.
Figure 2:
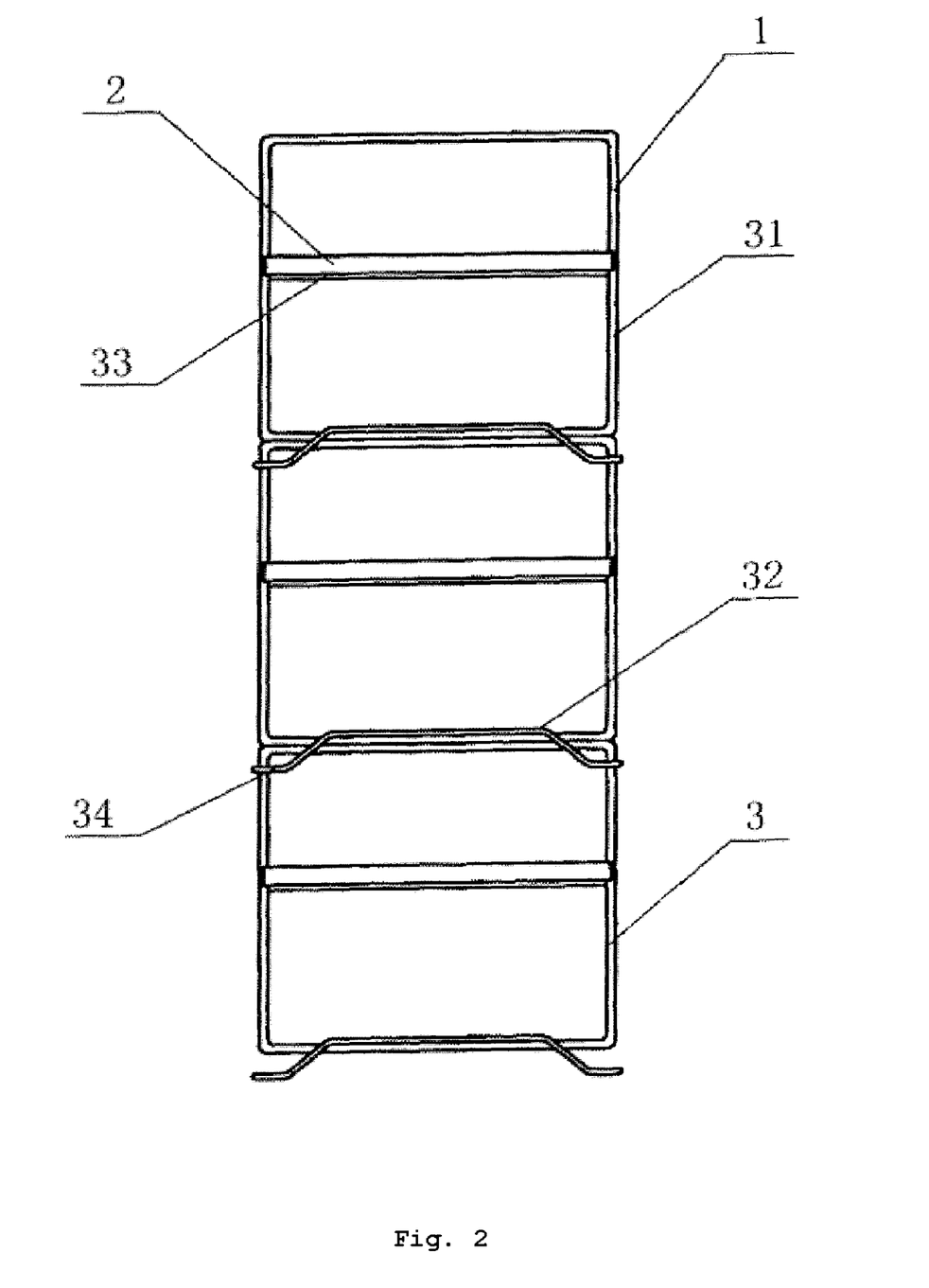
FIG. 2 is a left view of a stackable rack according to an embodiment of the present invention.
Figure 3:
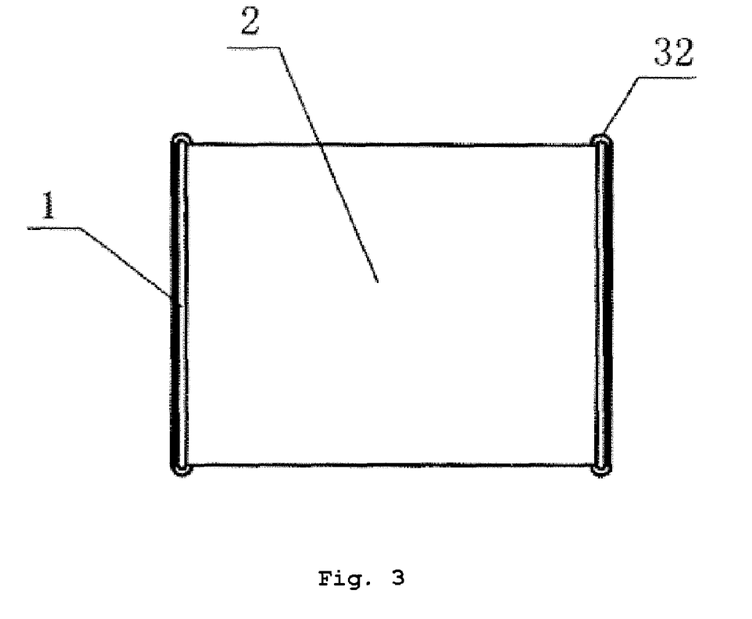
FIG. 3 is a top view of a stackable rack according to an embodiment of the present invention.
Figure 4:
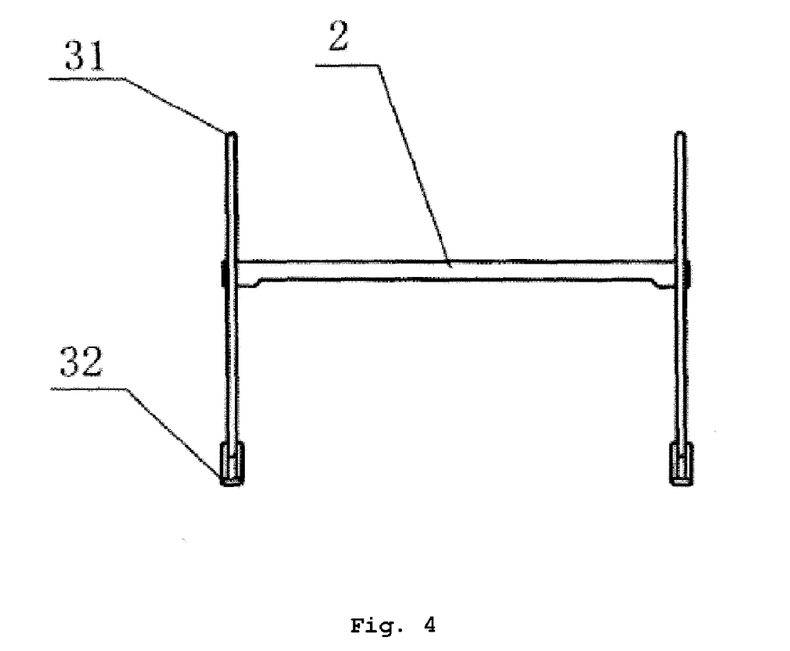
FIG. 4 is a front view of a support unit of a stackable rack.
Figure 5:
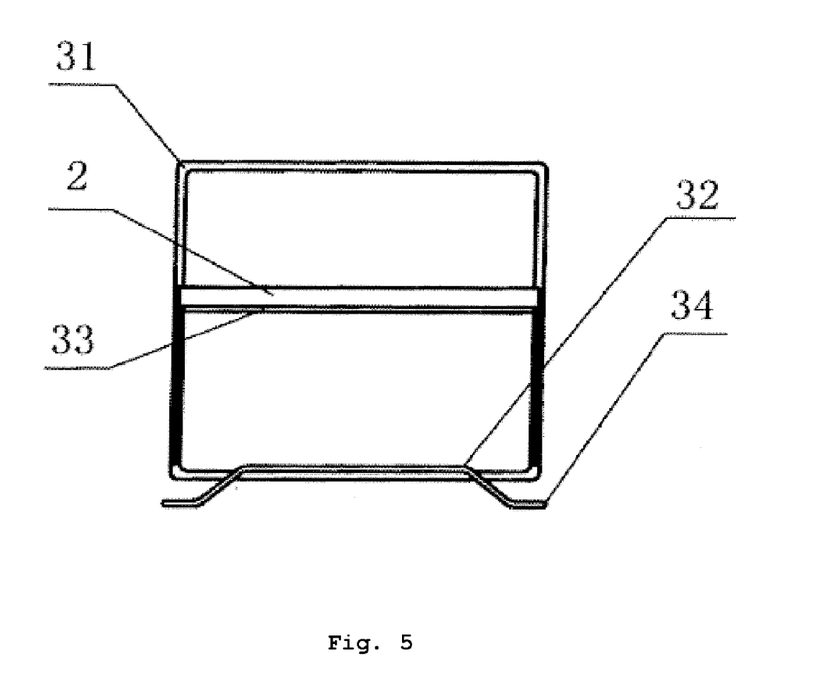
FIG. 5 is a left view of a support unit of a stackable rack.
Figure 6:
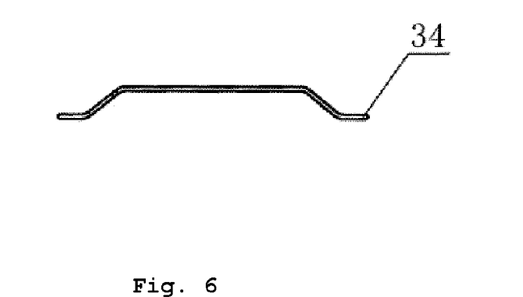
FIG. 6 is a front view of a foot support means.
Figure 7:
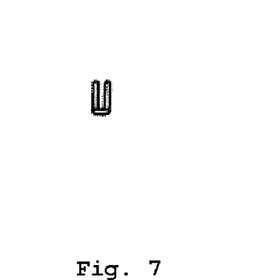
FIG. 7 is a left view of a foot support means.
Figure 8:
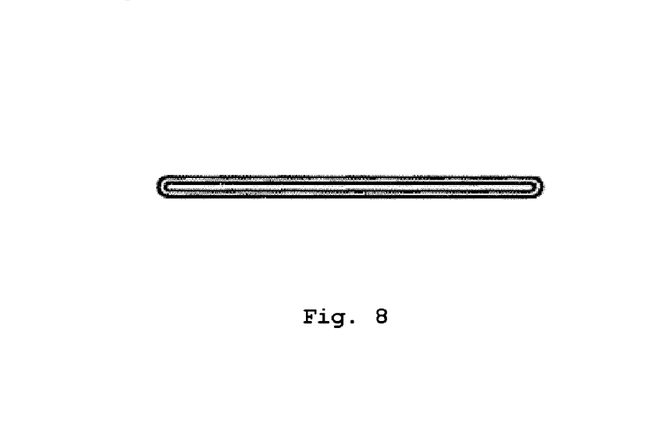
FIG. 8 is a top view of a foot support means.

During the formation of the foot support means 32, a wire is bent to form an closed, elongated and oblate metal loop, the inner width of the loop is substantially equal to the thickness of the rectangular frame to hold one side of the rectangular frame 31, the two ends of the wire may be remained or joined by welding, and then the metal loop is bent at both ends thereof to form the foot support means 32.

Figure 9:
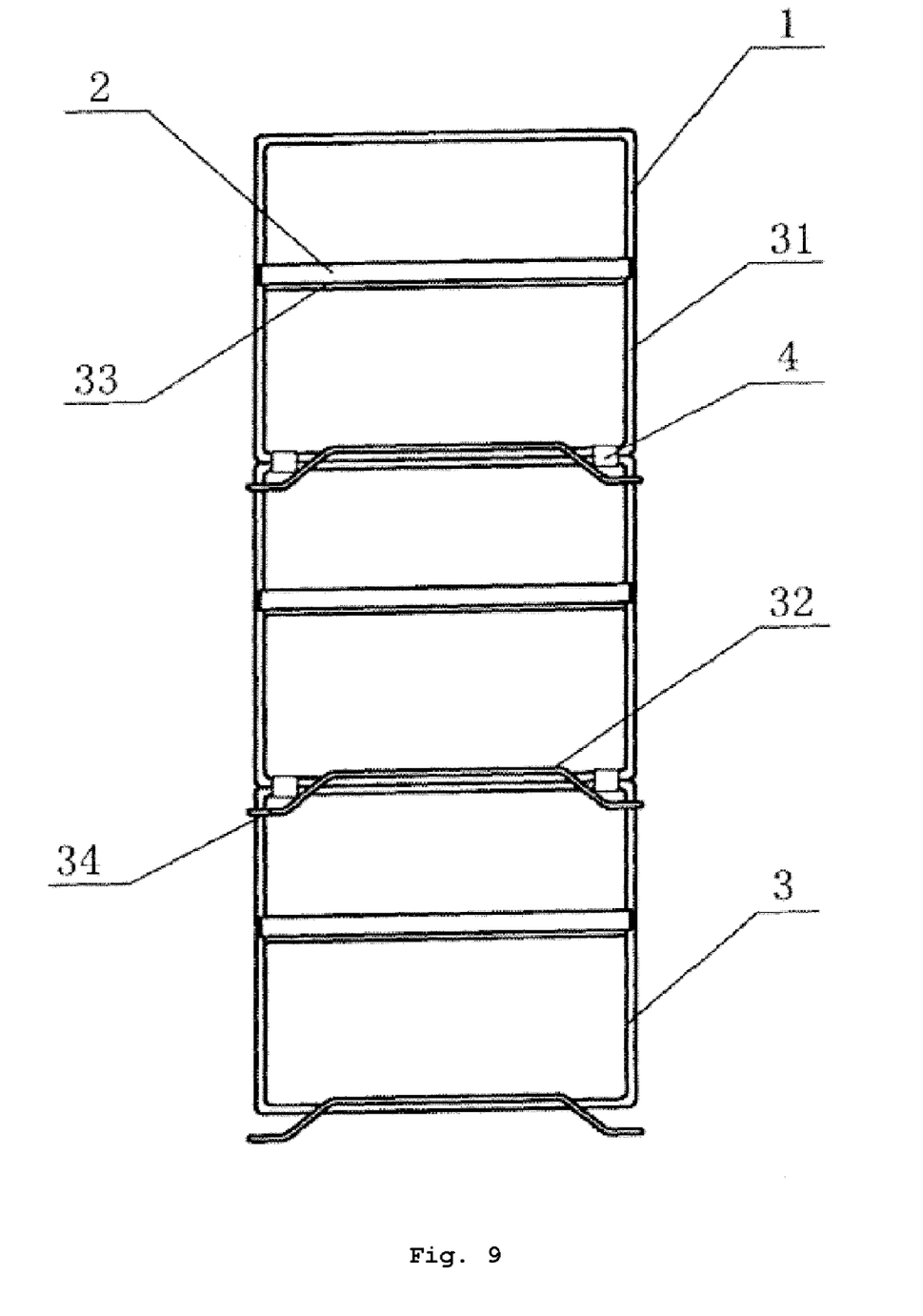
FIG. 9 is a left view of a stackable rack with C-shaped spring buckles.

In order to prevent the upper and lower side supports from disengagement, a C-shaped spring buckle 4 for fastening upper and lower adjacent rectangular frames 31 may be further provided at a triangular zone formed between the rectangular frame 31 and a trapezoid edge of the foot support means 32 on each side corner of each stacked boundary. The C-shaped spring buckle 4 is preferably made of a spring steel sheet, the width of which is smaller than the corner width defined by the triangular zone to allow the mounting of the C-shaped spring buckle.

Figure 10:
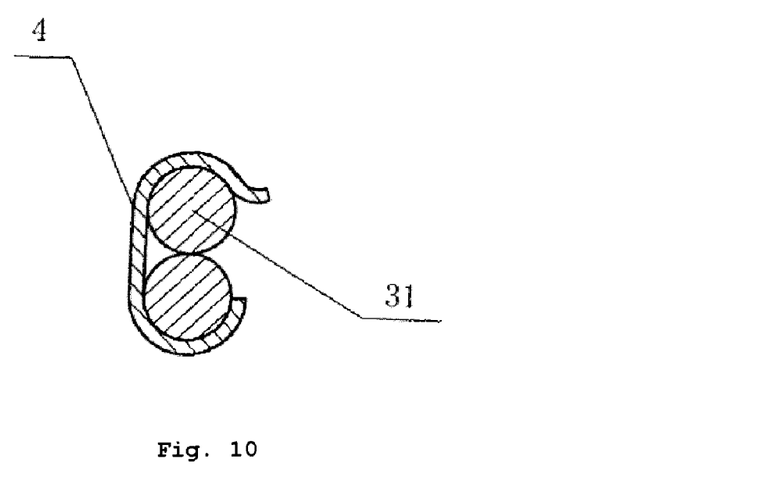
FIG. 10 is a sectional view of an assembly with the first C-shaped spring buckle.

The C-shaped spring buckle maybe implemented with three embodiments. As the first form of the C-shaped spring buckle 4, the C-shaped spring buckle is a C-shaped spring buckle with one end edge turned up to facilitate the fastening. When in use, an end of the C-shaped spring buckle which is not turned up grasps 31 one side of the rectangular frame, and then the other end which is turned up snaps on one side of another rectangular frame to connect the upper and lower adjacent rectangular frames.

Figure 11:
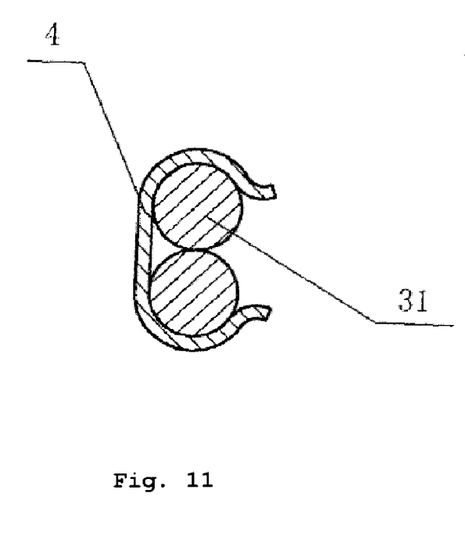
FIG. 11 is a sectional view of an assembly with the second C-shaped spring buckle.

As the second form of the C-shaped spring buckle, the C-shaped spring buckle is a C-shaped spring buckle with both end edges turned up. When in use, both ends of the C-shaped spring buckle 31 are simultaneously pressed to enclose two connecting sides of another rectangular frame to connect the upper and lower adjacent rectangular frames.

Figure 12:
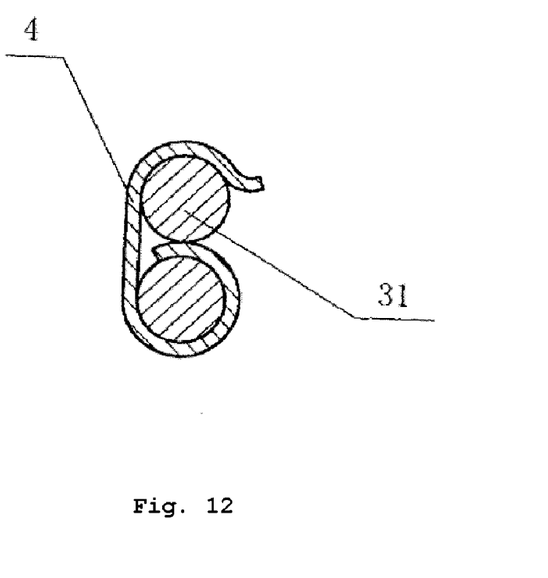
FIG. 12 is a sectional view of an assembly with the third C-shaped spring buckle.
Figure 13:
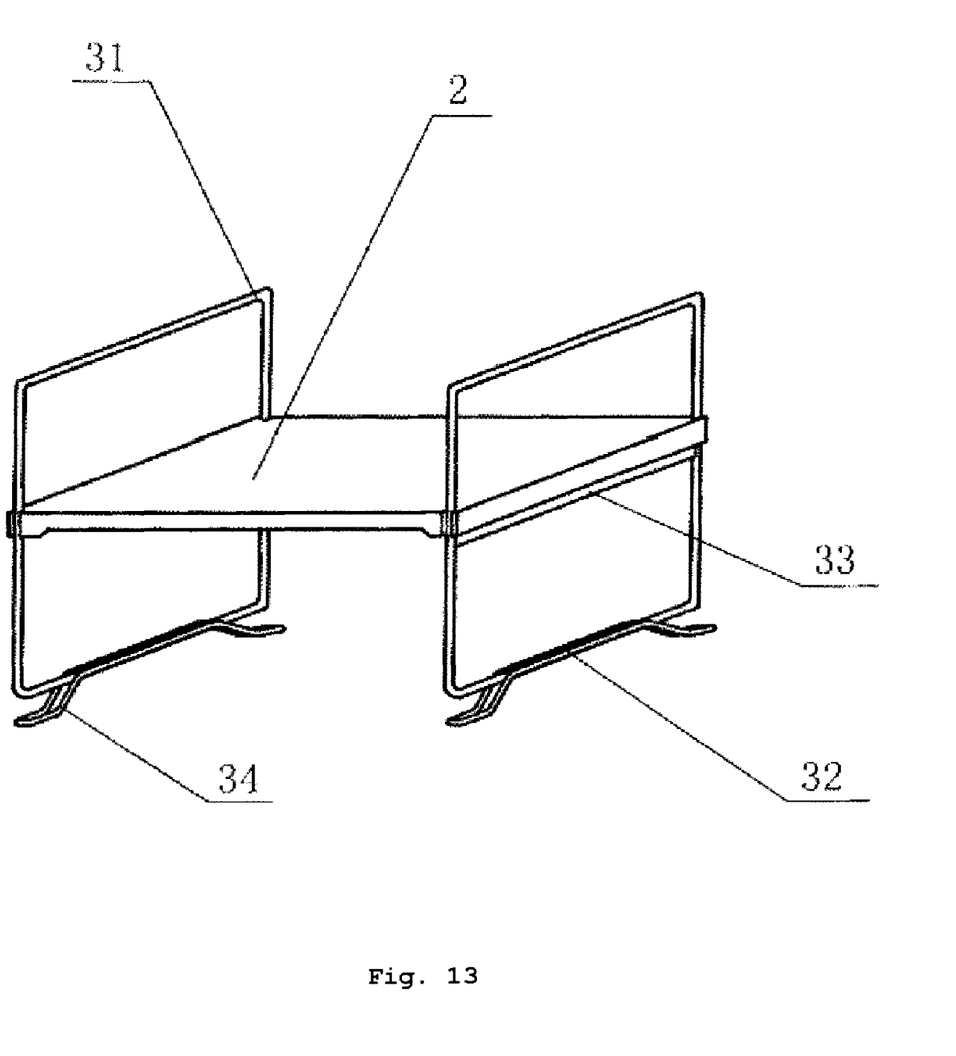
FIG. 13 is a perspective view of a support unit.

As the third form of the C-shaped spring buckle, the C-shaped spring buckle is a C-shaped spring buckle with one end edge turned up, and the other end rotatably enclosing the lower side of the rectangular frame 31. When in use, it is only necessary to rotate the spring buckle to allow the turned up end to snap on one side of another rectangular frame so as to connect the upper and lower adjacent rectangular frames.

When stacking, the horizontal foot loops 34 of the support means of one support unit are fitted over the upper corners of the rectangular frame 31 of another support unit 3 to form a stacking by planar joint, which enables more stability of the upper and lower side supports. In order to prevent the upper and lower side support units 3 from disengagement, a C-shaped spring buckle 4 for fastening upper and lower adjacent rectangular frames may be further provided at a triangular zone formed between the rectangular frame 31 and a trapezoid edge of the foot support means 32 on each side corner of each stacked boundary. Therefore, the stackable rack according to the present invention is easy to be stacked, and the upper and lower side supports on the same side is maintained within the same plane to reduce deformation and reinforce the stacking.

What is claimed is:

1. A stackable rack, comprising:
   two side supports; and
   a shelf plate between the two side supports;
   wherein each of the side supports comprises at least one support unit, the support unit comprises a rectangular frame and a foot support, the rectangular frame is further provided with a cross bar to support the shelf plate, the foot support is bent into trapezoid with an oblate metal ring, the two ends of the trapezoid are close and bent into horizontal foot loops, the inner distance of the horizontal foot loops is longer than the width of the rectangular frame, the upper side of the foot support clamps the lower side of the rectangular frame and is fixed by welding to form the support unit, and the horizontal foot loops of the foot support of one support unit are fitted over the upper corners of the rectangular frame of another support unit so as to stack up.

2. The stackable rack of claim 1, wherein a C-shaped spring buckle for fastening upper and lower adjacent rectangular frames is further provided at a triangular zone formed between the rectangular frame and a trapezoid edge of the foot support on each side corner of each stacked boundary.

3. The stackable rack of claim 2, wherein the C-shaped spring buckle is a C-shaped spring buckle with one end edge turned up.

4. The stackable rack of claim 2, wherein the C-shaped spring buckle is a C-shaped spring buckle with both end edges turned up.

5. The stackable rack of claim 2, wherein the C-shaped spring buckle is a C-shaped spring buckle with one end edge turned up, and the other end rotatably enclosing the lower side of the rectangular frame.

* * * * *